United States Patent [19]

Grantham

[11] 4,002,560
[45] Jan. 11, 1977

[54] AUTOMATIC ARTICLE SORTING APPARATUS

[76] Inventor: Frederick W. Grantham, 12055 Goshen Ave., Los Angeles, Calif. 90066

[22] Filed: July 24, 1975

[21] Appl. No.: 598,862

[52] U.S. Cl. .............................. 209/73; 209/74 R; 209/82; 271/192; 214/6 DK
[51] Int. Cl.² .......................................... B07C 1/10
[58] Field of Search ............... 209/73, 74 R, 74 M, 209/82; 271/192; 214/6 DK; 38/8–11

[56] References Cited

UNITED STATES PATENTS

| | | |
|---|---|---|
| 2,933,185 | 4/1960 | Coleman et al. ............... 209/74 R |
| 3,675,791 | 7/1972 | Russell et al. ..................... 271/192 |
| 3,680,692 | 8/1972 | Southworth ..................... 209/74 M |

*Primary Examiner*—Allen N. Knowles
*Attorney, Agent, or Firm*—Henry M. Bissell

[57] ABSTRACT

An automatic laundry sorting machine comprising separate sorting stations having individually driven conveyor units for feeding and sorting folded laundry articles according to size. Sorting and sensing means are associated with at least one of the conveyor units to actuate a release mechanism for articles of selected predetermined size. Articles of other sizes are not released but are passed to subsequent stations where further sorting may occur. Articles not fitting any of the predetermined size-sensing criteria can be passed or by-passed through the conveyor units and discharged outside the system. Alternative embodiments including counters strategically placed in subsequent stations and unique jam eliminating circuitry are described.

20 Claims, 10 Drawing Figures

AUTOMATIC ARTICLE SORTING APPARATUS

BACKGROUND OF THE INVENTION

1. Field of the Invention

The present invention relates to automatic article sorting apparatus and, more particularly, to such apparatus adapted for sorting laundered articles according to their lengths.

2. Description of the Prior Art

My prior U.S. Pat. No. 3,467,138, issued Aug. 19, 1969, discloses apparatus for automatically folding laundered articles of various sizes, such apparatus being particularly adapted for commercial or institutional use where large quantities of articles are laundered. Clean, unfolded articles of mixed sizes are sequentially fed into one portion of the apparatus and the articles in a folded condition are dispensed from another portion of the machine onto a receiving table or conveyor. However, the apparatus does not provide means for sorting the articles in any manner, the folded articles being dispensed in the same order as they were fed into the apparatus.

While such an automatic folding apparatus has been commercially successful and has provided substantial cost savings by eliminating the labor previously required to fold large quantities of laundered articles, time is still required either to manually sort articles fed into the apparatus, or to manually sort articles dispensed from the apparatus, into appropriate size categories such as wash cloths, hand towels, bath towels, pillow cases and sheets.

To applicant's knowledge, no practical apparatus is available which will automatically sort such laundered articles, either before or after folding, into preselected categories such as size, or which will allow such sorting on a selective basis, that is, which will allow an operator to cause selected articles to by-pass the sorting apparatus and proceed to a common discharging portion, such as sometimes may be necessary or desired for various reasons.

SUMMARY OF THE INVENTION

An automatic article sorting apparatus, in accordance with the invention, comprises a plurality of series-arranged article conveyor assemblies having associated therewith a plurality of article receiving assemblies. Discharging means are provided for selectively discharging sorted articles from each of the conveyor assemblies to their associated receiving assembly. Sorting means are provided which are adapted for sorting articles conveyed by the conveyor assemblies according to at least one preselected article parameter and cooperating with the discharging means to cause articles having substantially different values of the preselected parameter to be automatically discharged from different ones of the conveyor assemblies. The sorting means includes means for momentarily stopping a conveyor assembly while an element is being discharged therefrom. Bypass means may be provided for selectively allowing an article to proceed, through previous ones of the conveyor assemblies, to a preselected one of the conveyor assemblies for discharging therefrom, regardless of the value of the article's preselected parameter.

More particularly, sorting of articles is provided according to their length; and the sorting means may provide either for discharging articles of progressively shorter or of progressively longer length from sequential ones of the conveyor assemblies. The discharging means includes a pair of pivotal discharging blades associated with each of the conveyor assemblies. In a similar manner, the sorting means inlcudes a plurality of individual sorting means, one said individual sorting means being associated with each of the conveyor assemblies.

At least some of the individual sorting means include a fixed switch, which is operated by an article passing thereby, and an associated presettable timing element. The length of time required for an article to be conveyed past the fixed switch is electically compared to the preset time on the timing element and an article is automatically caused to be discharged by pivoting the associated discharging blades when the actual passing time exceeds the preselected time. Successive individual sorting means have timers preset to successfully shorter preselected times to cause successively shorter articles to be discharged.

In combination with a laundered article folding machine, three conveyors and associated discharging assemblies, receiving assembly and individual sorting means are employed. The first two of the individual sorting means are provided with timing elements preset respectively, at the first and second preselected times. The third sorting means provides for only discharging all articles which bypass the first two individual sorting means. All three individual sorting means however provide for a momentary stopping of conveyor belt of the conveyors when an article is being discharged therefrom so that the falling article does not overshoot the associated receiving assembly.

The three conveyors and associated discharging and receiving assemblies, may be of different lengths and be arranged in order of decreasing length. If means are provided for causing articles to bypass the first two discharging assemblies, however, the third conveyor and associated discharging and receiving assemblies are constructed to be the same length as the first, unless provision is made for also bypassing the third discharging means and discharging articles out the end of the apparatus.

The sorting means are easily adaptable to sort on the basis of article parameters other than length. For example, photodetectors may be provided, in place of the switches and timing elements, to detect differences in article surface reflectivity, whereby articles may be sorted according to their color or material from which they are fabricated.

BRIEF DESCRIPTION OF THE DRAWINGS

A better understanding of the present invention may be had from a consideration of the following detailed description, taken in conjunction with the accompanying drawings, in which.

DESCRIPTION OF THE PREFERRED EMBODIMENT

Figure 1:
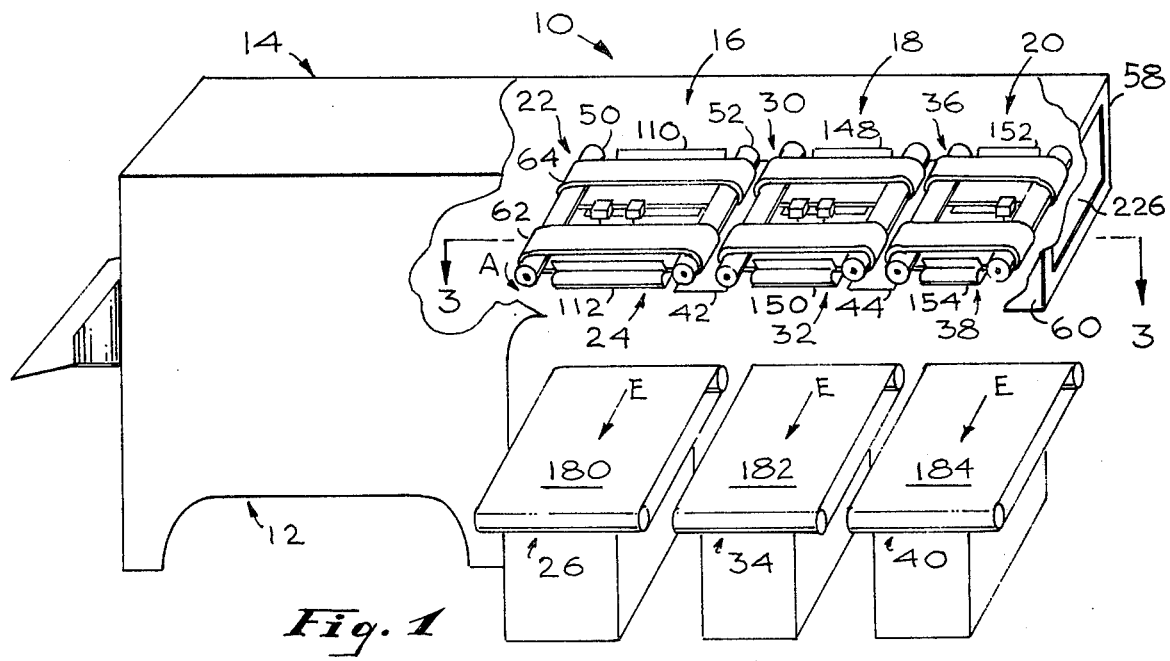
FIG. 1 is a perspective view, partially broken away, of article sorting apparatus in accordance with the present invention, shown integrally connected to an article folding apparatus.

An automatic article sorting apparatus 10, for sorting folded laundry articles, is connected, as best seen in FIG. 1, in article receiving relationship with a laundry folding apparatus 12 to form a composite laundry folding and sorting machine 14. The folding apparatus 12, which is disclosed in my prior U.S. Pat. No. 3,462,158 forms no part of my present invention.

Figure 2:
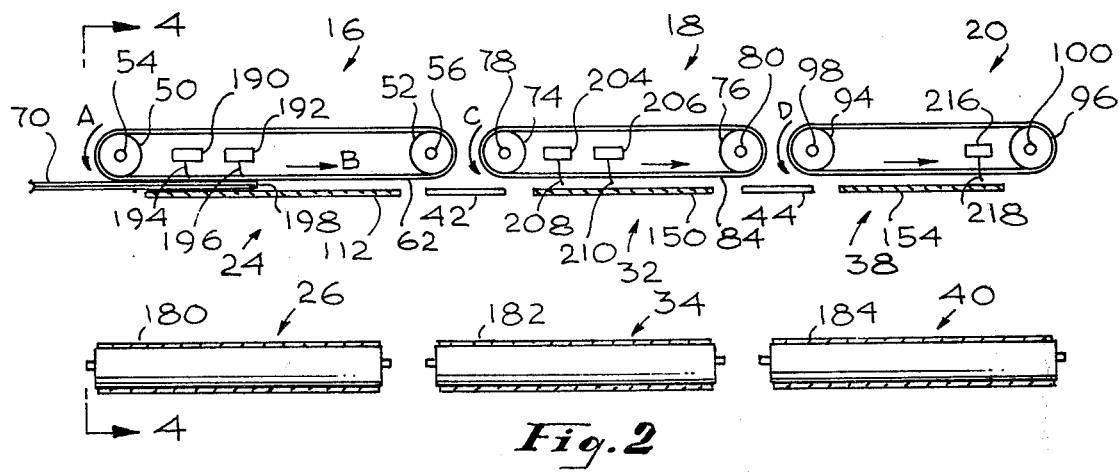
FIG. 2 is a vertical sectional view of the article sorting apparatus of FIG. 1.
Figure 3:
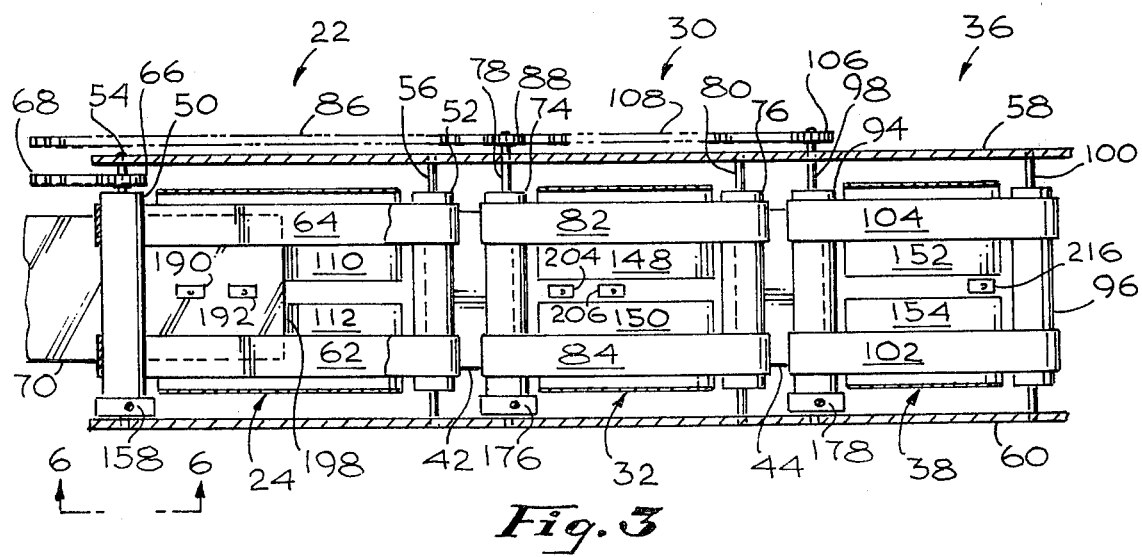
FIG. 3 is a bottom view along line 3—3 of FIG. 1 showing an article advancing across the first sorting station.

As more particularly described below, the article sorting apparatus 10, which sorts articles according to their lengths, comprises generally a pluraliy (three being shown) of substantially identical and series or tandem arranged sorting stations: a first sorting station 16, a second sorting station 18 and a third sorting station 20 (FIGS. 1–3). The first sorting station 16 comprises a first conveyor belt assembly 22 and first discharging assembly 24 with a first receiving assembly 26 disposed therebelow. Similarly, the second sorting station 18 comprises a second conveyor belt assembly 30, a second discharging assembly 32 and a second receiving assembly 34, and the third sorting station 20 comprises a third conveyor belt assembly 36, a third discharging assembly 38 and a third receiving assembly 40. Associated with the first two sorting stations 16 and 18 are means for comparing the lengths of articles passing along the respective conveyor belt assemblies 22 and 30 to first and second predetermined lengths. If the first predetermined length of an article is not reached in the first sorting station 16, the article is passed to the second sorting station 18. If the second predetermined length for the second sorting station is not reached, the article is passed to the third sorting station. Transfer of articles from one sorting station to the next is facilitated by a first flat guideway member 42 disposed between and below adjacent portions of the first and second conveyor assemblies 22 and 30, and a second flat guideway member similarly disposed between the second and third conveyor assemblies 30 and 36.

More particularly described, the first conveyor belt assembly 22 comprises two horizontally spaced belt support rollers: a forward (in respect to the laundry folding apparatus 12) roller 50 and a rear roller 52, both of which are mounted transversely to the longitudinal axis of the sorting apparatus 10 and which are rotatably supported upon shafts 54 and 56, respectively, in side walls 58 and 60 which form rearward exteriors of sides of the folding apparatus. Mounted upon the rollers 50 and 52 are two laterally spaced, flexible conveyor belts 62 and 64 (FIGS. 1 and 3). The forward roller 50 is driven in a counterclockwise direction (the direction of arrow A in FIGS. 1 and 2) by means of a sprocket 66 which is mounted upon the shaft 54 and which is driven from portions (not shown) of the folding apparatus 12 by a drive chain 68. Lower portions of the belts 58 and 60 are thereby caused to be driven rearwardly (in the direction of arrow B, FIG. 2) to cause an article 70, delivered to the first sorting station 16 by a conveyor (not shown) at the article folding apparatus 12, to be advanced rearwardly towards the second and third sorting stations 18 and 20 between such belts and the first discharging assembly 24 which is disposed immediately therebelow.

In a similar manner, the second conveyor assembly comprises a forward roller 74 and a rearward roller 76 mounted upon shafts 78 and 80 respectively, which are pivotably mounted in the walls 58 and 60, the roller 74 being comparatively close to the roller 52. Two laterally spaced conveyor belts 82 and 84 are mounted on the rollers 74 and 76. The forward roller 74 is also driven in a counterclockwise direction (direction of arrow C, FIG. 2) by a chain 86 which passes over a sprocket 88 fixed to the shaft 78 (FIG. 3). Likewise, the third conveyor assembly comprises a forward roller 94 (positioned adjacent to the roller 76) and a rear roller 96 journalled for rotation in walls 58 and 60 upon shafts 98 and 100 respectively. Spaced conveyor belts 102 and 104 are mounted upon the rollers 94 and 96. The roller 94 is driven, through a sprocket 106 mounted on shaft 98 and by a chain 108, to cause such roller to rotate in a counterclockwise direction (direction of arrow D, FIG. 2).

Figure 4:
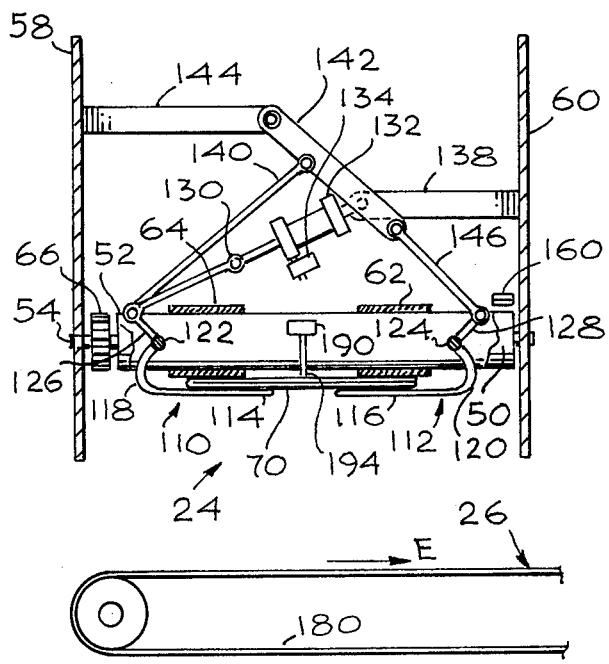
FIG. 4 is a vertical sectional view, along line 4—4 of FIG. 2, showing the article discharging blades of the first sorting station in a condition for advancing an article.

The discharging assembly 24, as seen in FIG. 4, comprises an opposing pair of shaped flipper blades 110 and 112 which have, in the normal article conveying configuration shown, flat horizontal portions 114 and 116 respectively, upon upper surfaces of which articles are conveyed, driven by the belts 62 and 64. The blades 110 and 112 also have generally vertical side portions 118 and 120, respectively which curve upwardly around under portions of the belts 62 and 64, between the rollers 50 and 52, and are pivotably mounted to structure not shown, at upper edges of such side portions by shafts 122 and 124, respectively. Operating arms 126 and 128 are affixed to upper edges of the blade sides 118 and 120, respectively, being directed generally outwardly. Pivotably mounted to the free arm 126 is a push rod 130 which is connected to a pneumatic cylinder 132, operation of which is controlled by a solenoid valve 134 connected thereto. An upper end of the cylinder 132 is pivotably mounted to a bracket 138 which projects inwardly from the side wall 60. For operation of the blade 112, one end of a link 140 is also pivotably mounted to the free end of the arm 126. The other end of the link 140 is connected to a bar 142 which is pivotably connected at an upper end to a bracket 144 fastened to the inside of the side wall 58. A link 146 is pivotably connected at one end to a lower portion of the bar 142 and its other end to the free end of the arm 126 affixed to the blade 112.

Assembled in a similar manner (and therefore not illustrated or described in detail) are similar flipper blades 148 and 150 of the second discharging assembly 32 and corresponding blades 152 and 154 of the third discharging assembly 38 (FIG. 3).

A roller brake assembly 158 is provided whereby the conveyor belt assembly 22 may be stopped, as more fully described below, when articles are discharged therefrom. The brake assembly 158, illustrated in FIG.

6, comprises a roller brake member 160 having a lower arcuate roller-contacting portion 162 and having a transverse upper arm portion 164. One end of the arm portion 164 is pivotably mounted to the inside of the wall 60 by a bolt 166. To the other end of the arm 164 is pivotably connected an actuating piston 168 of a pneumatic cylinder 170. The upper end of the cylinder 170 is mounted to the wall 60 by a bolt 172. Operation of the cylinder 170 is controlled by a solenoid valve 174 which is connected thereto. Similar brake assemblies 176 and 178 are mounted adjacent to the roller 74 of the second conveyor belt assembly 30 and the roller 94 of the third conveyor belt assembly 36, respectively (FIG. 3).

The first, second and third receiving assemblies 26, 34 and 40 comprise generally conventional conveyor belts 180, 182 and 184 mounted upon pairs of roller conventionally driven, in a manner not shown, in the direction of the arrows E in FIG. 1. Such receiving assemblies may be similar to those described in my prior U.S. Pat. No. 3,462,138 (incorporated herein by reference) and may be such that the conveyor belts are vertically spring-biased so that they are automatically depressed downwardly by the weight of articles received thereupon, so that articles may be received in stacked form upon the conveyor when it is not being operated.

To enable sorting articles received from the folding apparatus 12, according to the length of such articles, electrical means are provided for comparing the length of articles conveyed upon each of the first two conveyor assemblies 22 and 30 with the first and second preselected lengths respectively, and for causing actuation of the first or second discharging assemblies 24 or 32, respectively, according to whether the length of the article is longer than the first preselected length, in which case it will be caused to be discharged through the first discharging assembly, or whether the article is shorter than the first preselected length but longer than the second preselected length, in which case it will be caused to be discharged through the second discharging assembly. If an article is shorter than both the first and second preselected lengths, neither of the discharging assemblies 24, 32 will be actuated and the article will be advanced to the third conveyor assembly 36, where it will be caused to be discharged through the third discharging assembly 38 and onto the third receiving assembly 40.

To these ends, first and second, normally open Microswitches 190 and 192 are positioned in closely spaced relationship between the belts 62 and 64 of the first conveyor assembly 22, and in locations near the receiving end of such conveyor assembly, the switch 190 being slightly closer to the folding apparatus 12 than is the switch 192. Switch actuating rods or levers 194 and 196 of the switches 190 and 192, respectively, project vertically downwardly between the belts 62 and 64 and the discharging blades 110 and 112, so that the rods will be contacted by a leading edge 198 of an article 70 passing rearwardly between the belts and the blades, and thereby cause actuation of the associated switches. Associated circuitry, depicted schematically in FIG. 7A, includes a conventional timing element 200 and a conventional delaying element 202, operation of which is more particularly described below.

Two normally open Microswitches 204 and 206 are similarly positioned near the forward end of the second conveyor 30, the switch 204 being positioned more forwardly than the switch 206. Actuating rods 208 adn 210 of switches 204 and 206, respectively, project downwardly between the conveyor belts 82 and 84 and the associated blades 148 and 150 so that they may be contacted by the article leading edge 198 to close the switches. Associated circuitry, depicted in FIG. 7B, includes a conventional timing element 212 and a conventional time delay element 214, more fully described below.

In the third conveyor assembly 36, only a single normally open Microswitch 216, having an actuating rod or lever 218 projecting downwardly between the conveyor belts 102 and 104 and the blades 152 and 154, is employed. The switch 216 is positioned to be near the rear, rather than the forward, portion of the conveyor assembly 36. Associated circuitry, described below and illustrated in FIG. 7C, includes a delaying element 220.

OPERATION

Assume the sorting station 16, 18 and 20 are arranged as above described and illustrated, the drive rollers 50, 74 and 94 being rotated in a counterclockwise direction (FIG. 2) to advance articles 70, picked up by the first conveyor belt assembly 22 from the folding apparatus 12, rearwardly toward the second and third stations 18 and 20.

Figure 7A:
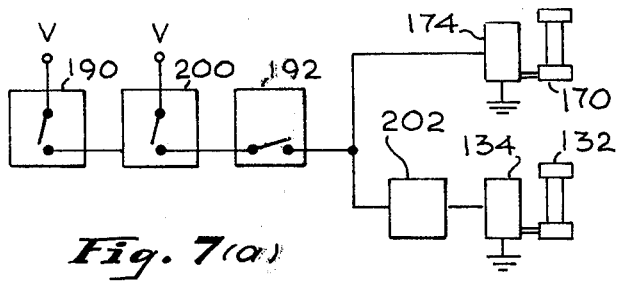
FIG. 7A depicting the controls for the first sorting station, FIG. 7B depicting the controls for the second sorting station and FIG. 7C depicting the controls for the third sorting station.

When an article 70 is advanced by the first conveyor assembly 22, the leading edge 198 thereof contacts the actuating rod 194 of the switch 190, thereby closing such switch (FIGS. 2 and 3). Referring to FIG. 7A, closing of the switch 190 actuates the timer 200, which is preset for the length of time the longest article to be sorted will take, considering its length and its advancing speed, to be advanced from a position contacting the switch actuating rod 194 to a position centered over the discharging blades 110 and 112. Initial closing of the switch 190 by the article 70 actuates the timer 200; subsequent opening of such switch resets the timer. Internal switching portions of the timer 200 do not close until the preset time has elapsed.

As the article 70 continues to be advanced past the switch 190, the leading edge 198 thereof contacts the actuating rod 196 of the switch 192, thereby closing that switch and maintaining it in a closed condition as long as the article is in contact therewith. The article 70 still continues to be advanced.

If an article 70 has a length equal to or greater than the length desired to be discharged by the first discharging assembly 24, the article will still be in contact with the actuating rod 196 of the switch 192, maintaining that switch closed, when the preset time on the timer 200 has elapsed and the internal switching portion of such timer closes. In such a case, voltage is applied through the timer 200 and the switch 192, to the solenoid valve 174 which controls the brake assembly 158, thereby actuating the brake assembly to cause the braking portion 162 to contact the roller 50 and stop rotation thereof. The roller 50 is frictionally mounted upon the drive shaft 54 so that the drive shaft continues to be rotated by the drive chain 68, even after rotation of the roller 50 has ceased. When the roller 50 is stopped, the conveyor belts 62 and 64 are also stopped.

Figure 5:
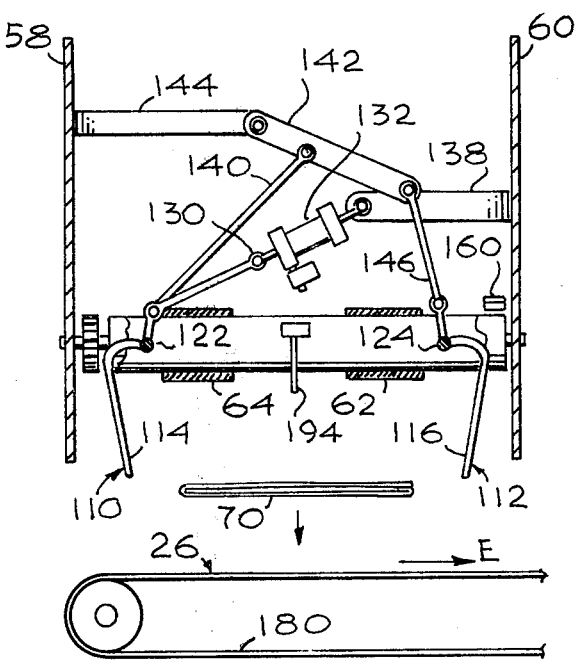
FIG. 5 is a vertical view along the plane of FIG. 4, showing the article discharging blades of the first sorting station in a condition for discharging an article.
Figure 6:
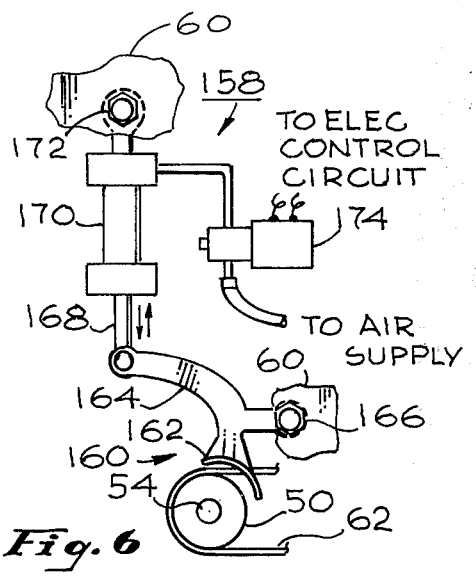
FIG. 6 is a sectional view, along line 6—6 of FIG. 3, showing a typical conveyor roller brake means.

Voltage is simultaneously fed, through the timer 200 and switch 192, to the delaying circuit 202 which, after a delay sufficient to allow complete stopping of the conveyor assembly 22, supplies voltage to the solenoid valve 134 to actuate the cylinder 132 and cause opening of the blades 110 and 112 of the discharging assembly 24 (FIG. 5). Actuation of the cylinder 132, which directly opens the blade 110 also causes, through the linkage comprising links 140 and 146 and bar 142, simultaneous opening of the blade 112. Opening of the blades 110 and 112 allows the article 70, which has just previously been brought to a stop, to drop straight downwardly onto the conveyor belt 180 of the receiving assembly 26. The purpose of stopping the conveyor belts 62 and 64 before discharging the article is to prevent the article's momentum from causing overshooting of the receiving conveyor belt 180. A neat stack can therefore be made on the belt 180.

If, however, an article 70 is shorter than the length determined by the timer 200 (that is, shorter than an article to be discharged at the first sorting station 16), the article will be advanced completely past the switch 192, thereby releasing its actuating rod 196 and opening the switch before the time preset on the timer 200 has elapsed. Since the switch 192 will be opened before the internal timing switch of the timer 200 is closed, neither of the control valves 170 or 134 will be actuated and the article will therebore be advanced by the conveyor assembly 22 across the plate 42 to the second sorting station 18.

Figure 7B:
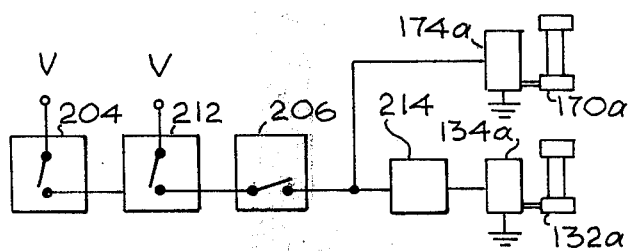
FIG. 7 is an electrical schematic of the article sorting controls of the apparatus of FIG. 1.
Figure 7C:
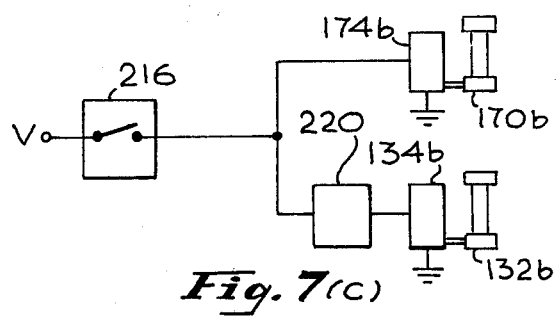

Operation of the circuitry depicted in FIG. 7B for the second sorting station 18, is substantially identical to that described above. Closing of the switch 204 by an article 70 advancing from the first sorting station 16 starts the timer 212 which is preset at a time less than that of the timer 200 so as to cause discharging of articles from the second sorting station 18 which are shorter than those discharged from the first sorting station 16. If the article is of a length to be discharged at the second sorting station, its rate of advancing will maintain the switch 206 closed until the internal switch of the timer 212 is closed. In such a case, voltage will be applied, through the switch 206 and timer 212, to a solenoid valve 172a of the brake assembly 176 associated with the roller 74, and the roller will be stopped. After a short delay, caused by the delaying element 214, a solenoid valve 134a will be actuated to cause actuation of a pneumatic cylinder 132a associated with operation of the discharging blades 82 and 84. The article 70 will thereby be dropped onto the conveyor 182 of the second receiving assembly 34.

Again, if an article 70 is so short that it is advanced out of contact with the switch 206 before the time present on the timer 212 has elapsed, the article will not be discharged from the second sorting station 18, and will be advanced onwardly by the conveyor belts 82 and 84, across the plate 44, to the third sorting station 20.

The third sorting station (unless manually over-ridden) discharges all articles 70 not discharged by the first and second sorting stations 16 and 18. When an article 70 contacts and closes the switch 216, voltage is applied through the switch to a control solenoid valve 174b (FIG. 7C) thereby actuating a pneumatic cylinder 170b associated with the brake assembly 178 adjacent the roller 94 and stopping the roller. After a delay caused by the delaying element 220, a solenoid valve 134b is actuated, causing actuation of a pneumatic cylinder 132b associated with the discharging blades 152 and 154 and thereby opening the blades and discharging the article 70 onto the conveyor belt 184 of the third receiving assembly 40.

As illustrated and described above, the article sorting apparatus 10 will sort articles into three different article length categories: longest articles being discharged at the first sorting station 16, articles of intermediate length being discharged by the second sorting station 18 and all other articles being discharged by the third sorting station 20. It will now be apparent that by the addition of more sorting stations similar to the first or second stations 16 or 18, sorting of articles into as many size categories as may be desired can readily be accomplished.

Figure 8:
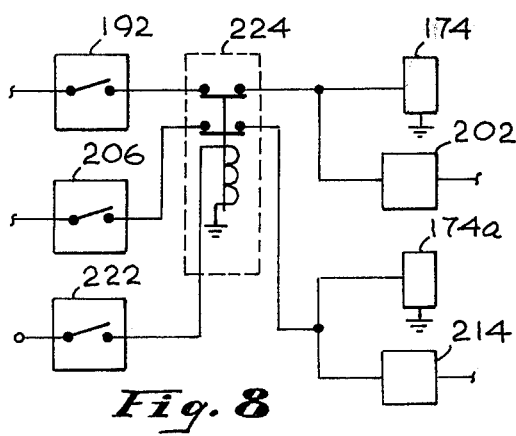
FIG. 8 is an electrical schematic of the sorting bypass system of the apparatus of FIG. 1.

Other variations will occur to those skilled in the art and are within the scope of the invention. Electrical bypass means may be provided for selectively causing articles to pass through the first and second sorting stations 16 and 18, without being sorted, so that they will be discharged at the third sorting station 20. Such bypassing may be accomplished, for example, as illustrated in FIG. 8, by an operator depressing a momentary-on switch 222 which temporarily opens, by means of a conventional presettable timing relay 224, the line in which the switches 180 and 204 or 192 and 206 are located for a time predetermined to be sufficient to cause the preselected article to be advanced to the third sorting station 20. The switch 222 may be positioned for operation by an operator feeding articles into the folding apparatus 12, the timing relay 224 being set for a time sufficient to allow the preselected article to be advanced through both the folding apparatus and the first and second sorting stations 16 and 18. In the event that such a bypass mode of operation is desired, the third sorting station 20 should be sufficiently long to accommodate the longest articles ordinarily sorted. That is, the first and third sorting stations 16 and 20 should be about the same length. Otherwise, where such bypassing is not employed, all stations may be constructed of decreasing lengths. However, even with a manual bypass provided, the second station 18 may be constructed shorter than the first and third stations 16 and 20.

If desired, another set of normally-closed contacts of the bypass switch 222 can be caused to temporarily open the line containing the switch 216 associated with the third sorting station 20, so that the articles are discharged out an open end portion 226 (FIG. 1) of the sorter, rather than through the discharging assembly 38. If such a variation is employed, the third sorting station 20 need not be constructed to be longer than required for normal sorting of articles thereby, and the three stations 16, 18 and 20 may be of decreasing length.

Another variation, particularly adapted to the apparatus of my prior U.S. Pat. No. 3,462,138, incorporates a "jam circuit" to cause an alarm to be given and the folding machine to shut down if an article fed into the machine is not discharged from the machine within a predetermined time — an indication of the article being caught or jammed somewhere within the machine. The switches 190 and 204 or 192 and 206 can be easily connected, in an obvious manner, to momentarily deactivate the jam circuit, such a circuit being otherwise wired to sound an alarm and stop the machinery if an article fed into the folding apparatus 12 is not discharged by the third sorting station 20 within a preselected length of time.

It is also possible to incorporate counting circuitry and counters responsive to operation of the various sorting stations 16, 18 and 20, whereby the count of articles discharged by each of the stations can be automatically obtained, a separate counter being provided for each station. In addition, a total article counter may be provided.

Although the automatic sorting apparatus 10 has been described and illustrated as normally (without manual bypass) discharging longest articles from the first sorting station 16 and shortest articles from the third sorting station 20, the arrangement may be reversed, with minor circuitry modifications, to cause the shortest articles to be discharged at a first sorting station (corresponding to station 16) and the longest articles to be discharged from a third sorting station (corresponding to station 20). Such an arrangement may be accomplished by providing that switches corresponding to the switches 192 and 206 be normally closed, rather than normally open, so that an advancing article causes the switches to be open. In that manner, for example, a short article will pass the switch corresponding to switch 192, allowing it to be closed when the preset time of the timer 200 has elapsed, thereby causing stopping of the first conveyor assembly 22 and opening of the first discharging assembly 24; a longer article will maintain the switch open when the timer switch closes, thereby causing the article to be advanced to the next sorting station.

Other variations are also within the scope of the invention. For example, optical switches may be used in place of the microswitches 190, 192, 204, and/or 216. Also other article parameters may be sorted upon. For example, a light source and an optical detector may be employed to allow sorting according to the optical reflectivity of the articles, articles of a first predetermined reflectivity being caused to be discharged, generally in the above-described manner, at a first sorting station, articles of a different reflectivity being caused to advance to a next sorting station, etc. In such manner, colored articles or articles of the same color but of different materials, may be easily sorted.

Thus, although there have been described herein specific arrangements of an automatic article-sorting apparatus in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. Apparatus for automatically sorting a plurality of intermixed laundry pieces differing according to a predetermined parameter and segregating them in separate stacks according to at least two different values of said parameter, the apparatus comprising:
   a. conveying means adapted for receiving sequentially a quantity of articles to be sorted and for conveying received articles therealong, the conveying means including at least an input conveyor assembly, an output conveyor assembly and a pair of intermediate conveyor assemblies arranged in series;
   b. receiving means associated with the conveying means and adapted for receiving sorted articles therefrom, the receiving means including a plurality of receiving assemblies individually associated with corresponding ones of the intermediate assemblies;
   c. a plurality of sorting means individually associated with corresponding ones of the intermediate conveyor assemblies for sensing articles being conveyed along the associated intermediate conveyor assemblies according to at least two selected values of a predetermined article parameter and for momentarily stopping the corresponding intermediate conveyor assembly upon sensing said predetermined parameter; and
   d. discharging means responsive to each sorting means for discharging a positively sorted article from its corresponding intermediate conveyor assembly to a predetermined receiving assembly.

2. The article sorting apparatus of claim 1, including selectively operable bypass means adapted for selectively causing an individual article to proceed along the conveying means to a predetermined one of the conveyor assemblies, regardless of the value of the preselected article parameter associated therewith.

3. The article sorting apparatus of claim 2, wherein the sorting means is adapted for causing an article caused by the bypass means to proceed to the predetermined one of said conveyor assemblies to be discharged therefrom.

4. The article sorting apparatus of claim 1, wherein the preselected article parameter is article length, and wherein the sorting means is adapted for being responsive to a length of an article being conveyed through the conveying means.

5. The article sorting apparatus of claim 4, wherein the immediate conveyor assemblies are constructed to be of different lengths and are arranged in said series according to the lengths thereof.

6. The article sorting apparatus of claim 5, wherein the immediate conveyor assemblies are arranged in said series to cause articles to be conveyed along successively shorter ones of said intermediate conveyor assemblies, and wherein the sorting means is adapted for causing longer articles to be discouraged before shorter articles are discharged.

7. The article sorting apparatus of claim 5, wherein the immediate conveyor assemblies are arranged in said series to cause articles to be conveyed along successively longer ones of said immediate conveyor assemblies, and wherein said sorting means is adapted for causing shorter articles to be discharged before longer articles are discharged.

8. The article sorting apparatus of claim 1, wherein the immediate conveyor assemblies include conveyor belts, wherein the discharging means comprises a plurality of pivotable discharge blade pairs arranged such that one of said blade pairs is associated with each of said conveyor assemblies, and wherein articles received by said conveying means are caused to be advanced between portions of said conveyor belts and said blade pairs.

9. In combination with a laundry folding machine, a folded article sorting apparatus, which comprises:
   a. a plurality of conveyors arranged in sequential communicating relationship,
      a first of said conveyors being disposed in receiving relationship with respect to a a discharge portion of the laundry folding machine, whereby to receive folded articles therefrom for sorting;
   b. a plurality of pivotable article discharging means disposed below the conveyors, each of said conveyors having associated therewith one of the discharging means;

c. receiving means associated with the discharging means for receiving articles discharged therefrom; and d. sorting means adapted for sorting folded articles being conveyed by the conveyors according to at least three different values of a preselected article parameter, said sorting means including control means for controlling operation of the discharging means and adapted for causing articles having substantially different values of said parameter to be automatically discharged by different ones of the discharging means, said controlling means including means for momentarily stopping any one of the conveyors from which an article is being discharged while the article is being discharged therefrom.

10. The combination of claim 9, further including bypass means adapted for causing preselected articles to proceed to a predetermined one of the conveyors without being discharged from previous ones of the conveyors, regardless of the value of said predetermined parameter associated therewith.

11. The combination of claim 10, wherein said preselected article is caused to be discharged at said predetermined one of said conveyors.

12. The combination of claim 9, wherein each of the discharging means comprises a pair of opposing blades pivotably mounted, at remote edges and parallel to the direction of movement of said conveyor associated therewith, for movement between an upper conveying condition and a lower discharging condition, articles being conveyed between a lower portion of said conveyor and an upper portion of said blades when said blades are in said upper conveying position and being discharged therethrough when said blades are in said lower discharging position.

13. The combination of claim 9, wherein the sorting means include a plurality of individual sorting means, one of said individual sorting means being associated with each of said conveyors and discharging elements, at least some of said individual sorting means each including at least one fixed switch responsive to movement of an article conveyed thereby and an associated timing element, the actual length of time required for a conveyed article to be conveyed past said fixed switch being compared to a preselected time set on said timing element, an associated one of said conveyors being stopped and an associated one of said discharging means being activated to discharge said article when said actual time exceeds said preselected time.

14. The combination of claim 13, wherein said conveyors and associated ones of said discharging means are spaced for substantially different lengths of articles, wherein said conveyors are arranged in series according to decreasing lengths, and wherein said sorting means are adapted for causing discharge of longer articles before shorter articles are discharged.

15. The combination of claim 9, further including selectively operable bypass means adapted for causing a preselected article to proceed along all of said conveyors without being discharged, regardless of the value of said preselected parameters, whereby said preselected article is caused to be ejected from the last of said conveyors of said series.

16. In combination with a laundry folding machine, a folded article sorting apparatus which comprises:

a. first, second and third conveyors arranged in series relationship for conveying articles received from the folding machine;

b. first, second and third discharging means for causing discharging of articles from said conveyors, the first, second and third discharging means being associated respectively with the first, second and third conveyors, the discharging means each comprising a pair of pivotably mounted blades pivotable between closed and discharge positions, and c. first, second and third operating means for causing operation of the discharging means between said closed and discharge positions, the first, second and third operating means being associated respectively with the first, second and third discharging means, the first, second and third operating means including control means, responsive to the lengths of articles conveyed across the first, second and third discharging means to cause articles longer than a first preselected length to be discharged by the first discharge means, articles shorter than the first predetermined length but longer than a second predetermined length to be discharged by the second discharge means, and articles shorter than the second predetermined length to be discharged by the third discharge means.

17. The combination of claim 16, further including selectively operable bypass means for causing preselected articles to be conveyed directly to the third conveyor, regardless of article length, and to be discharged by said third conveyor.

18. The combination of claim 17, wherein the first and third conveyors are substantially the same length, and the second conveyor is substantially shorter than the first and third conveyors.

19. The combination of claim 16, further including means for stopping portions of any one of the first, second and third conveyors when a corresponding one of the first, second and third discharging means is operated, whereby to allow discharged articles to fall straight downwardly out of the discharging means.

20. The combination of claim 16, wherein each of the conveyors comprises a pair of longitudinally spaced rollers and a pair of laterally spaced conveyor belts mounted thereupon.

* * * * *